Nov. 13, 1928.     1,691,684
H. W. TROMANHAUSER
SAFETY LIGHTING DEVICE FOR VEHICLES
Filed Aug. 12, 1927
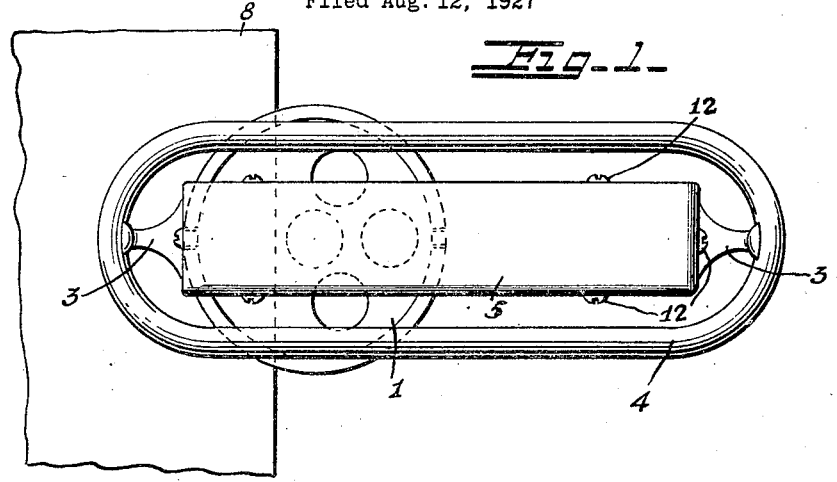
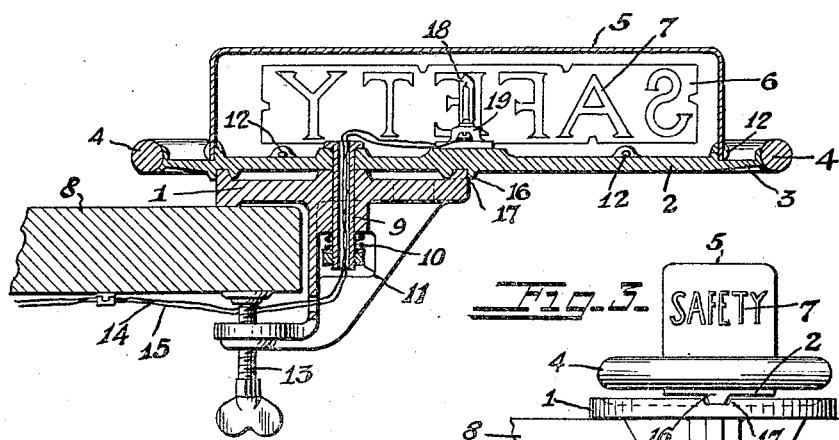
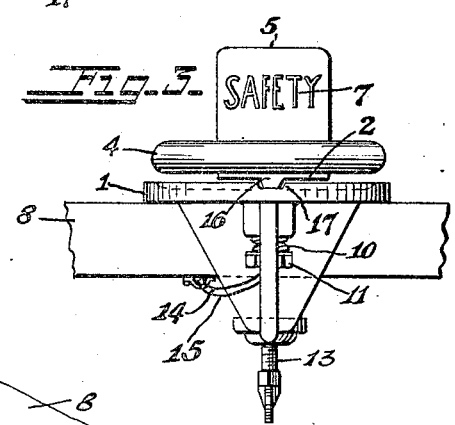
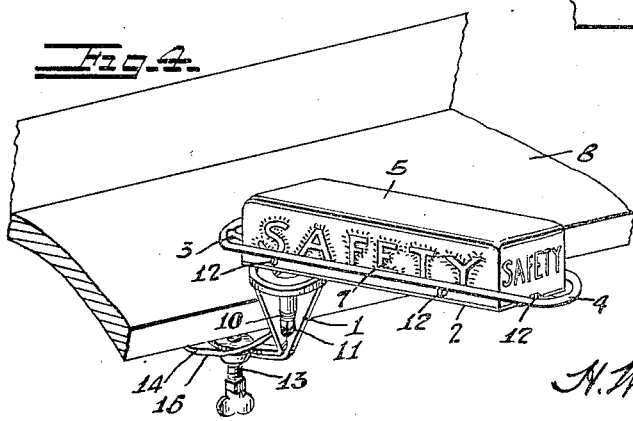
Inventor.
H. W. Tromanhauser by
G. C. Kennedy
Attorney Patented Nov. 13, 1928.

1,691,684

UNITED STATES PATENT OFFICE.

HARRY W. TROMANHAUSER, OF WATERLOO, IOWA.

SAFETY LIGHTING DEVICE FOR VEHICLES.

Application filed August 12, 1927. Serial No. 212,523.

My invention relates to improvements in safety lighting devices for automobiles, and the object of my improvement is to furnish for motor cars or other vehicles, an illuminating device which can be varied in position for different lighting uses on the vehicle for warning and safety purposes, and which is so yieldingly movably mounted upon its supporting means as to be shifted into an unobstructing position on the vehicle when violently pushed upon by a colliding vehicle or object, and without injury to itself or the car or object in collision.

The above object I have accomplished by the means which are hereinafter described and claimed, and which are illustrated in the accompanying drawings, in which Fig. 1 is a plan view of the device, on an enlarged scale. Fig. 2 is an enlarged central vertical longitudinal section of said device as mounted on said vehicle running board, and with parts in elevation or broken away. Fig. 3 is an enlarged side elevation of the device of said Figs. 1 and 2. Fig. 4 is a perspective view of the device as extended from the running board.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

My improved lighting device is particularly appropriated to be used upon motor cars having side running boards at a comparatively low level. The device, however, may be mounted upon a different structure of the car, as may be desired and for similar functions as a safety signaling device.

In the drawings the numeral 20 denotes a passenger motor car of the usual type, having running boards 8. My device includes a horizontally disposed circular bracket body 1 having upon its upper surface a raised marginal ring part 17 upon which is rockingly fitted a depending annularly grooved part 16 upon the under face of an elongated metal base body 2, the two superposed bodies 1 and 2 being vertically apertured in registration to provide a bearing for a headed tubular axial member 9, the head whereof rests upon the upper face of the base body 2 and the lower part whereof depends below the under face of an axial stem integral with the body 1. The lower end of the axial body 9 is exteriorly threaded to receive a compression nut 11 between which and the end face of the said stem a coiled compression spring 10 is seated and engaged. The bracket body 1 also has an integral angularly directed clamping arm below supplied with a vertical threaded bearing aperture to receive a clamping set-screw 13, the latter having a rockable head of the usual kind to engage the under face of a running-board 8 of said motor car. The abutting part of the bracket disk 1 is positioned over and in engagement with the upper face of said running board to act as a complementary clamping member thereupon associated coactingly with said clamping arm and screw 13.

The basal body 2 may be a casting, or otherwise, and has at each end a longitudinal medial arm 3 upon which is supported either integrally or separately rigidly an elongated hollow bumper body 4 with arcuate ends, spaced apart all around and practically parallel with, the outer contours of the body 2 and in substantially the same horizontal plane. Upon the middle line of the base body 2 is removably mounted the base 19 of an electric lamp 18 whose conductors are thence passed downwardly through the central aperture of the axial body 9, said conductors numbered 14 and 15, thence being led to some source of lighting electrical current upon the car 20.

An elongated hollow housing 5 is mounted removably upon the base body 2 to substantially cover its entire upper surface except the arms 3 and bumper 4. One or both of the longer sides of said housing may have transparent or translucent windows 6, which may receive any inscription, such as that shown at 7, and when the device is extended at a right angle to the running board 8, said housing 5 and its windows 6 project considerably beyond the car laterally, affording an easily seen warning to other cars which may be approaching from the front or rear. A similar window may be provided in either or both ends of the housing 5, and inscribed also in a manner whereby the lamp within may illuminate the window, and when the window is directed to face the car as the device is extended, the entire side of the car is more or less lighted up, so that a passing car and its chauffeur may clearly see it and be able to avoid collisions therewith.

An important feautre is the mounting of the base body 2 rockingly upon the bracket member 1 by means of the coacting parts 16 and 17. These parts are normally kept in frictional contact by the compression spring 10 so that the body 2 is not easily rocked when extended. When the device is extended, and is forcibly struck by a passing car, this friction is overcome, and the body 2 rises in further compressing the spring 10, so as to rock upon the bracket 1 to a position parallel with and partially above the running board 8, as shown in said Fig. 6. As the body in collision strikes the bumper member 4, the device is not only shifted out of the path of movement of the colliding car, but the shock is absorbed so as to prevent injury or breakage of the device.

The device is useful, when the base body 2 is rocked suitably to be either parallel or at an angle to the car, for use as a parking or warning signal, and is visible for a long distance.

Having described my invention, what I claim as new, and desire to secure by Letters Patent, is:

1. In a device of the character described, a signal carrying device comprising a bracket clamping means mounted removably upon a projecting part of a vehicle, a base body rockingly mounted upon said clamping means, means for resiliently yieldingly controlling the rocking movements of said base body, a lighting device mounted upon said base body, and a windowed housing removably mounted upon the base body surrounding said lighting device.

2. In a device of the character described, in combination, a bracket body having clamping means permitting it to be removably clamped upon the running board of a vehicle, said bracket body having an annular top rib and an axis centered therein, a base body of elongated shape having a depending annular bearing part seated upon said annular rib and axis rockingly, means connected between said bodies for yieldingly resiliently controlling the relative movements of the base body, lighting means mounted upon the base body, and a windowed casing removably mounted upon the base body inclosing said lighting means permitting directing the light therefrom in desired directions.

3. In a device of the character described, in combination, a bracket body adapted to be removably mounted upon a vehicle, said body having an annular top, an elongated base body mounted pivotally upon and having a grooved seat fitting said annular top, means for yieldingly resiliently connecting said bodies together while permitting unlimited rocking movements of said base body, the base body being pivoted to the bracket body at a location nearer one of its ends than the other, a signaling device mounted upon said base body, and a bumper body encircling said base body below the signaling device.

In testimony whereof I affix my signature.

HARRY W. TROMANHAUSER.